US012443154B2

(12) United States Patent
Reynolds et al.

(10) Patent No.: US 12,443,154 B2
(45) Date of Patent: Oct. 14, 2025

(54) FEATURE EXTRACTION INTEGRATION WITH CONTROL PROGRAMS

(71) Applicant: Rockwell Automation Technologies, Inc., Mayfield Heights, OH (US)

(72) Inventors: Jordan C. Reynolds, Austin, TX (US); John J. Hagerbaumer, Mequon, WI (US); Troy W. Mahr, Pleasant Prairie, WI (US); Thomas K. Jacobsen, Wake Forest, NC (US); Giancarlo Scaturchio, Pisa (IT)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 741 days.

(21) Appl. No.: 17/698,498

(22) Filed: Mar. 18, 2022

(65) Prior Publication Data

US 2023/0297041 A1 Sep. 21, 2023

(51) Int. Cl.
*G05B 13/04* (2006.01)
*G05B 13/02* (2006.01)

(52) U.S. Cl.
CPC ....... *G05B 13/041* (2013.01); *G05B 13/0265* (2013.01)

(58) Field of Classification Search
CPC .. G05B 13/041; G05B 13/0265; G06N 20/00; G06F 18/2113
See application file for complete search history.

(56) References Cited

U.S. PATENT DOCUMENTS

2018/0300600 A1* 10/2018 Ma ......................... G06N 3/082
2019/0187631 A1* 6/2019 Badgwell ............... G06N 3/006

FOREIGN PATENT DOCUMENTS

EP 3907971 A1 11/2021
WO WO-2020031903 A1 * 2/2020

OTHER PUBLICATIONS

WO2020031903A1 Translation (Year: 2020).*
Patryk Frelewicz et al.; "Application of Machine learning to Performance Assessment for a class of PID-based Control Systems;" ARXIV.org, Cornell University Library, Jan. 8, 2021; 30 pages.
Extended European Search Report for EP Application 23160712.8, mailed Jul. 31, 2023; 15 pages.

* cited by examiner

*Primary Examiner* — Schyler S Sanks (57) ABSTRACT

Various embodiments of the present technology generally relate to industrial automation environments. More specifically, embodiments include systems and methods for training a machine learning model for implementation in the environment. In some embodiments, an application receives a data set that comprises a control program configured for implementation by a Programmable Logic Controller (PLC). The application processes the data set and calculates derivative values based on the data set. The design application identifies types for individual ones of the feature vectors and ranks the feature vectors based on their types. The design application weights the feature vectors based on their ranks. The design application generates feature vectors that comprise the derivative values and supplies the weighted feature vectors to the machine learning model for training. The application receives a machine learning training output generated by processing the weighted feature vectors.

20 Claims, 7 Drawing Sheets

FEATURE EXTRACTION INTEGRATION WITH CONTROL PROGRAMS

BACKGROUND

Industrial manufacturing environments generate huge quantities of data at very fast speeds making the extraction of enterprise-level insights challenging. In industrial automation environments, control systems are used to drive various operations along an industrial line. Control code is used by industrial drives or Programmable Logic Controllers to drive industrial assets, devices, and sensors in an industrial process. Operational data produced during runtime contains important information about the status, performance, or quality of the industrial process, but can be difficult to leverage in near-real time given the enormous amount of computing power and time that goes into operational analytics. Control programs are typically developed by programmers prior to implementation and the ability to adjust control programs after implementation or during runtime is limited. Unfortunately, manually editing control programs in response to operational data is a difficult and time-consuming process. Moreover, industrial automation environments do not effectively or efficiently utilize historical data to generate control programs.

Machine learning algorithms are designed to recognize patterns and automatically improve through training and the use of data. Examples of machine learning algorithms include artificial neural networks, nearest neighbor methods, gradient-boosted trees, ensemble random forests, support vector machines, naïve Bayes methods, and linear regressions. A machine learning algorithm comprises an input layer and an output layer, wherein complex analyzation takes places between the two layers. Various training methods are used to train machine learning algorithms wherein an algorithm is continually updated and optimized until a satisfactory model is achieved. One advantage of machine learning algorithms is their ability to learn by example, rather than needing to be manually programmed to perform a task, especially when the tasks would require a near-impossible amount of programming to perform the operations in which they are used. Given the large amount of data generated by automated industrial environments, it is often difficult to train machine learning systems for a specific process within the environments. Unfortunately, industrial automation environments do not effectively or efficiently train machine learning models.

Overview

This Overview is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various embodiments of the present technology generally relate to solutions for integrating machine learning models into industrial automation environments. Some embodiments comprise a system that is configured to train a machine learning model for implementation in an industrial automation environment. In the system, a design component receives a data set that comprises a control program that is configured for implementation by a Programmable Logic Controller (PLC). A machine learning interface component processes the data set and calculates derivative values based on the data set. The machine learning interface component identifies types for individual ones of the derivative values, ranks the derivative values based on their types, and weights the derivative values based on their ranks. The machine learning interface component generates feature vectors that comprise the derivative values and supplies the feature vectors to the machine learning model to train the machine learning model. The design interface receives a machine learning training output generated by processing the feature vectors.

In some embodiments, an apparatus comprises computer readable storage media and processors operatively coupled with the computer readable storage media. The storage media store program instructions to train a machine learning model for implementation in an industrial automation environment. When the program instructions are executed by the processors, the computing apparatus receives a data set that comprises a control program configured for implementation by a PLC. The computing apparatus processes the data set and calculates derivative values based on the data set. The computing apparatus identifies types for individual ones of the derivative values, ranks the derivative values based on their types, and weights the derivative values based on their ranks. The computing apparatus generates feature vectors that comprise the derivative values supplies the feature vectors to the machine learning model to train the machine learning model. The computing apparatus receives a machine learning training output generated by processing the feature vectors.

Some embodiments comprise a method to train a machine learning model for implementation in an industrial automation environment. The method entails receiving a data set that comprises a control program that is configured for implementation by a PLC. The method continues by processing the data set and calculating derivative values based on the data set. The method continues by identifying types for individual ones of the derivative values, ranking the derivative values based on their types, and weighting the derivative values based on their ranks. The method continues by generating feature vectors that comprise the derivative values and supplying the feature vectors to the machine learning model to train the machine learning model. The method continues by receiving a machine learning training output generated by processing the feature vectors.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology generally relate to solutions for integrating machine learning models into industrial automation environments. More specifically, embodiments of the present technology include systems and methods to perform targeted training of machine learning models to generate control program optimizations, produce recommendations, and improve performance of existing control programs. Generally, industrial control programs provide instructions for controlling and performing certain operations within an industrial environment via controllers like Programmable Logic Controllers (PLCs). The controllers execute the control programs to control downstream devices, machinery, and automated processes.

The present technology serves to enhance industrial automation environments by enabling targeted training of machine learning models for use within the environments. Industrial automation environments often fail to effectively integrate machine learning models to assist in generating control code. Moreover, industrial automation environments often fail to effectively train machine learning models to target specific aspects of the environments. In an implementation of the present technology, machine learning models may be made available to programmers in the industrial control programming environment similar to other industrial assets. For example, a control code programming environment may allow a programmer to "drag and drop" known industrial assets into the process being programmed. The selected asset may correspond to machinery in an automated processes come with pre-set parameters and/or settings. The programmer can then connect the asset to other assets, devices, models, inputs, or outputs when constructing the process. The programmer may toggle a machine learning model to train the machine learning model for the specific process and to receive machine learning feedback on the process being programmed. In accordance with the present disclosure, a programmer may direct a design application to calculate derivative values for an industrial process. The programmer may weight ones of the derivative values to emphasize those values during machine learning training. The design application may generate feature vectors comprising the weighted derivative values and transfer the feature vectors to the machine learning model. The machine learning model may ingest the weighted feature vectors and train itself. For example, the weighted feature vectors may cause the machine learning model to train itself to target a specific variable and/or asset in the industrial environment.

The models are capable of being applied to an existing control program utilizing similar input/output (I/O) mechanics as other industrial assets. In accordance with the present disclosure, machine learning models may be connected with external networks and/or other elements within the industrial automation environment like a computing device hosting a design application. The machine learning models may receive training data from elements in the industrial automation environment and the external networks. In an embodiment, a machine learning model is trained with respect to an operation and may consume data relevant to that operation within an industrial automation environment. The machine learning model may provide an output to optimize control program based on the consumed data. For example, an input to the machine learning model may be data from a thermometer monitoring a reactor temperature within a chemical production process. In response to input from the thermometer, the model may determine that control code being created by a programmer should be modified to account for deficiencies in the chemical production process. The output from the model may modify a control program to optimize the chemical production process to achieve a specific target parameter like viscosity.

A machine learning model comprises one or more machine learning algorithms that are trained based on historical data and/or other types of training data. A machine learning model may employ one or more machine learning algorithms through which data can be analyzed to identify patterns, make decisions, make predictions, or similarly produce output that can inform control code and/or parameters. Examples of machine learning algorithms that may be employed solely or in conjunction with one another include artificial neural networks, nearest neighbor methods, ensemble random forests, support vector machines, naïve Bayes methods, linear regressions, or similar machine learning techniques or combinations thereof capable of predicting output based on input data. Determining which machine learning methods to use may depend on the specific purpose or functions required in a particular industrial setting. In some examples, a machine learning asset outputs a decision indicating an optimization with regards to the structure and/or composition of control code generated by a programmer. The output can be used to adjust parameters and/or settings to optimize control code. In other examples the machine learning asset outputs the determined parameters and/or settings directly for integration into the control code. Other outputs with a similar purpose may exist and are contemplated herein.

Machine learning models may be implemented to perform asset and/or optimization in industrial automation environments. That is, models may be used to edit control code such that a device or process is optimized according to a specific control scheme. For example, models can be selectively trained using weighted training values and be used to optimize performance, yield, energy consumption, cost, and the like.

Machine learning models may be deployed on premises in an industrial automation environment or off-site. For example, the machine learning model may be implemented in a cloud computing environment and have a live connection with a programming system configured to generate control code. Machine learning models inherently have a useful lifecycle as the environment around it changes. Over time, the models become ubiquitous and can, in essence, wear out, just like any other machine or sensor on an industrial line. Thus, the machine learning assets disclosed herein may be periodically replaced and/or retrained to maintain the integrity of machine learning outputs.

To accompany the use of control program integrated models, corresponding faceplates, displays, Human Machine Interfaces (HMIs), and the like are contemplated herein to provide intuitive representations and interfaces to models on-site and in the programming environment. A machine learning model faceplate may comprise basic controls and/or visuals relevant to the control program that the model is assisting within the control environment. In this manner, machine learning can be brought into the on-site user experience more fully as well as into the programming environment. For example, an operator can view or use a model faceplate on a kiosk within the industrial automation environment to perform a task such as turning the model on or off, disconnecting the model from the line, or monitoring the model. The faceplate may also be useful for performing slightly more complex tasks such as offsetting parameters, providing inputs, tuning parameters of the model, overriding the model, or checking the status of the model.

Figure 1:
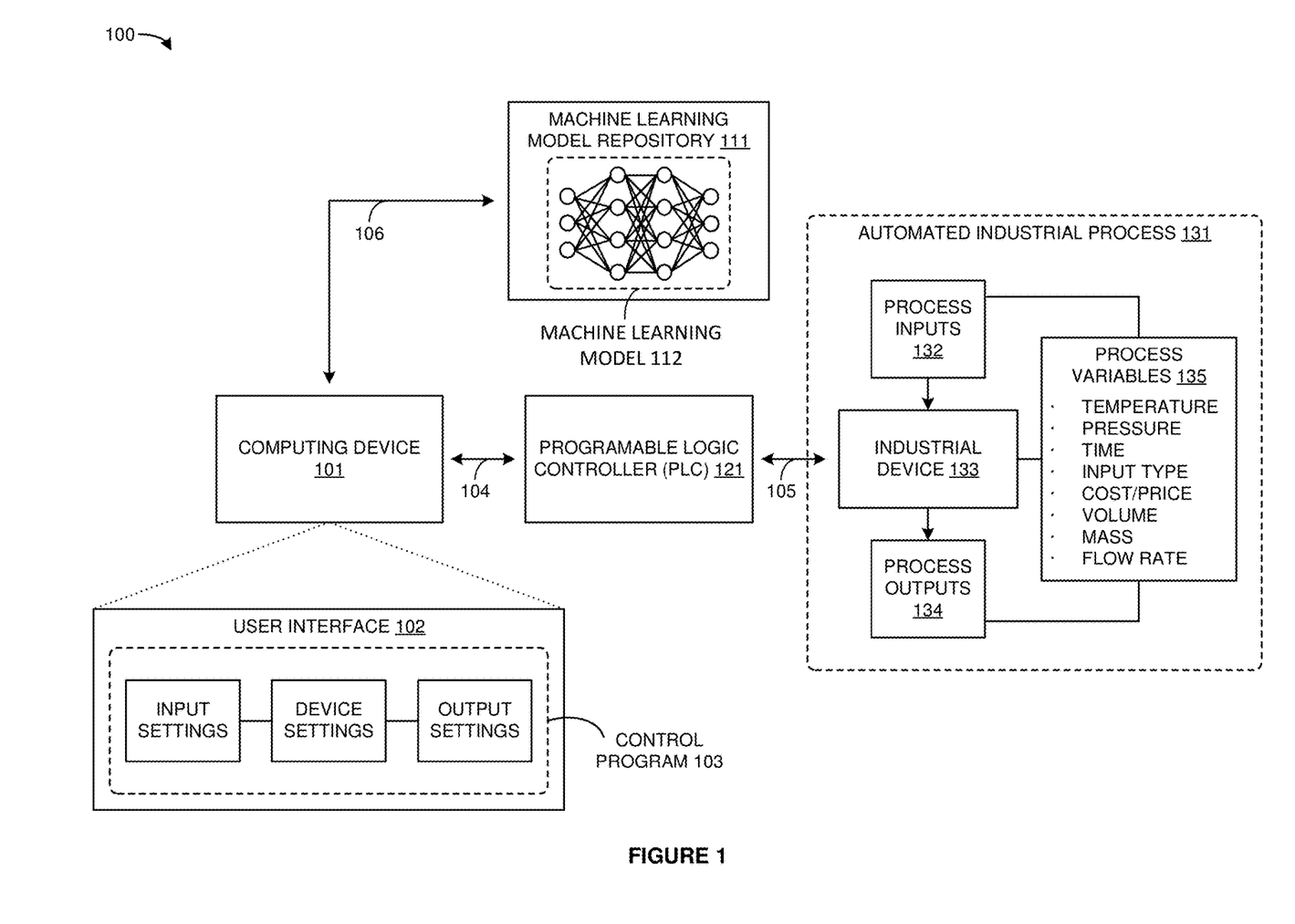
FIG. 1 illustrates an exemplary industrial automation environment to train a machine learning model.

Now referring to the Figures, FIG. 1 illustrates industrial automation environment 100 to train a machine learning model. Industrial automation environment 100 performs services like factory automation, factory control, machine control, smart manufacturing, machine communication and organization, and the like. Industrial automation environment 100 comprises computing device 101, machine learning model repository 111, Programmable Logic Controller (PLC) 121, and automated industrial process 131. Computing device 101 comprises User Interface (UI) 102 and control program 103. Machine learning model repository 111 comprises machine learning model 112. Automated industrial process 131 comprises process inputs 132, industrial device 133, process outputs 134, and process variables 135. In other examples, industrial automation environment 100 may include fewer or additional components than those illustrated in FIG. 1. Likewise, the illustrated components of industrial automation environment 100 may include fewer or additional components, assets, or connections than shown. Each of computing device 101, machine learning model repository 111, and PLC 121, may be representative of a single computing apparatus or multiple computing apparatuses.

Computing device 101 comprises one or more computing apparatuses configured to host applications to generate control program 103 and to interact with machine learning model 111. Computing device 101 may host additional applications to interface PLC 121, and other devices that may be present in environment 100. It should be appreciated that the specific number of applications/modules hosted by computing device 101 is not limited. Exemplary applications hosted by computing device 101 comprise Studio 5000, industrial design applications, and the like. Control program 103 comprises instructions that drive the operation of automated industrial process 131. In this example, control program 103 comprises an input settings block, a device settings block, and an output settings block that correspond the individual components of automated industrial process 131. Computing device 101 may transfer control program 103 to PLC 121 to control the operations of automated industrial process 131. Typically, the blocks of control program 103 comprise control code. For example, the device settings block illustrated on FIG. 1 may correspond to industrial device 133 and comprise a program to control the various components that comprise device 133.

UI 102 comprises a display, keyboard, touchscreen, tablet, and the like. UI 102 displays a Guided User Interface (GUI) that allows a user to interact with the application(s) hosted by computing device 101, including the design application configured to generate control program 103 and the machine learning interface application to access machine learning model 112. In some examples, a user may interact with the GUI via UI 102 to generate control program 103. For example, a user may select, drag-and-drop, or perform some type of action via UI 102 and the GUI to construct control program 103. In some examples, a user may interact with the GUI via UI 102 to train machine learning model 112 to provide optimization feedback for automated industrial process 131.

Computing device 101 is functionally coupled to machine learning model repository 111. For example, computing device 101 may host a machine learning interface application to communicate with machine learning model repository 111. Machine learning model repository 111 hosts machine learning model 112 configured to process and optimize control programs (e.g., program 103). Machine learning model 112 is representative of any machine learning model implemented within industrial automation environment 100 as described herein. The machine learning model 112 hosted by repository 111 may be trained using weighted feature vectors generated by computing device 101. A feature vector comprises a set of derivative values which are numerical representation of an object. Feature vectors may be ingested by a machine learning model to train the model and/or receive feedback from the model. For example, a feature vector may represent an aspect of the input settings block of control program 103. The weighted feature vectors allow machine learning model 112 to be selectively trained to focus on optimizing a particular aspect of process 131. Once trained, machine learning model 112 may receive and process a control program generated by computing device 101. Machine learning model 112 may generate outputs that indicate errors, optimizations, suggestions, and the like for the control program. Machine learning model repository 111 may transfer the outputs to computing device 101 for display on UI 102.

Computing device 101 is functionally coupled to PLC 121. PLC 121 is functionally coupled to automated industrial process 131. PLC 121 receives and implements a control program from computing device 101. The blocks that constitute control program 103 comprise industrial control code that provide instructions for PLC 121 to control automated industrial process 131. PLC 121 executes the control code to control downstream devices and machinery. PLC 121 identifies which blocks of control program 103 correspond to the ones of process components 132-134. For example, PLC 121 may correlate an Identity (ID) code for the "input settings" block of control program 103 to process inputs 132. PLC 121 may implement the blocks of control program 103 to specify the operations of components 132-134 of process 131. For example, the "input settings" block of control program 103 may comprise code that specifies a volumetric flowrate for an input stream of process inputs 132.

Automated industrial process 131 comprises process inputs 132, industrial device 133, process outputs 134, and process variables 135. Automated industrial process 131 may comprise a manufacturing, chemical production, food processing, or any other type of industrial process. Process inputs 132, industrial device 133, and process outputs 134 are connected in series. Process inputs 132 comprise an input stream for industrial device 133. Industrial device 133 is representative of any type of industrial machinery configured to carry out process 131. Industrial device 133 receives process inputs 132 and responsively generates process outputs 134. Process variables 135 comprise various operating constraints that affect components 132-134. For example, process variables 135 may comprise a target viscosity of process outputs 134. Automated industrial process 131 may receive a control program from PLC 121 and operate in response to the control instructions to conduct its operation.

Computing device 101, machine learning model repository 111, PLC 121, and automated industrial process 131 communicate over links 104-106 using communication technologies like industrial ethernet, Institute of Electrical and Electronic Engineers (IEEE) 802.3 (ENET), IEEE 802.11 (WIFI), Bluetooth, Time Division Multiplex (TDM), Data Over Cable System Interface Specification (DOCSIS), Internet Protocol (IP), General Packet Radio Service Transfer Protocol (GTP), and/or some other type of wireline and/or wireless networking protocol. Links 104-106 comprise metallic links, glass fibers, radio channels, or some other communication media. The links use ENET, WIFI, virtual switching, inter-processor communication, bus interfaces, and/or some other data communication protocols.

Computing device 101, machine learning model repository 111, PLC 121, and automated industrial process 131 comprise microprocessors, software, memories, transceivers, bus circuitry, and the like. The microprocessors comprise Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of industrial automation environment 100 as described herein.

Figure 2:
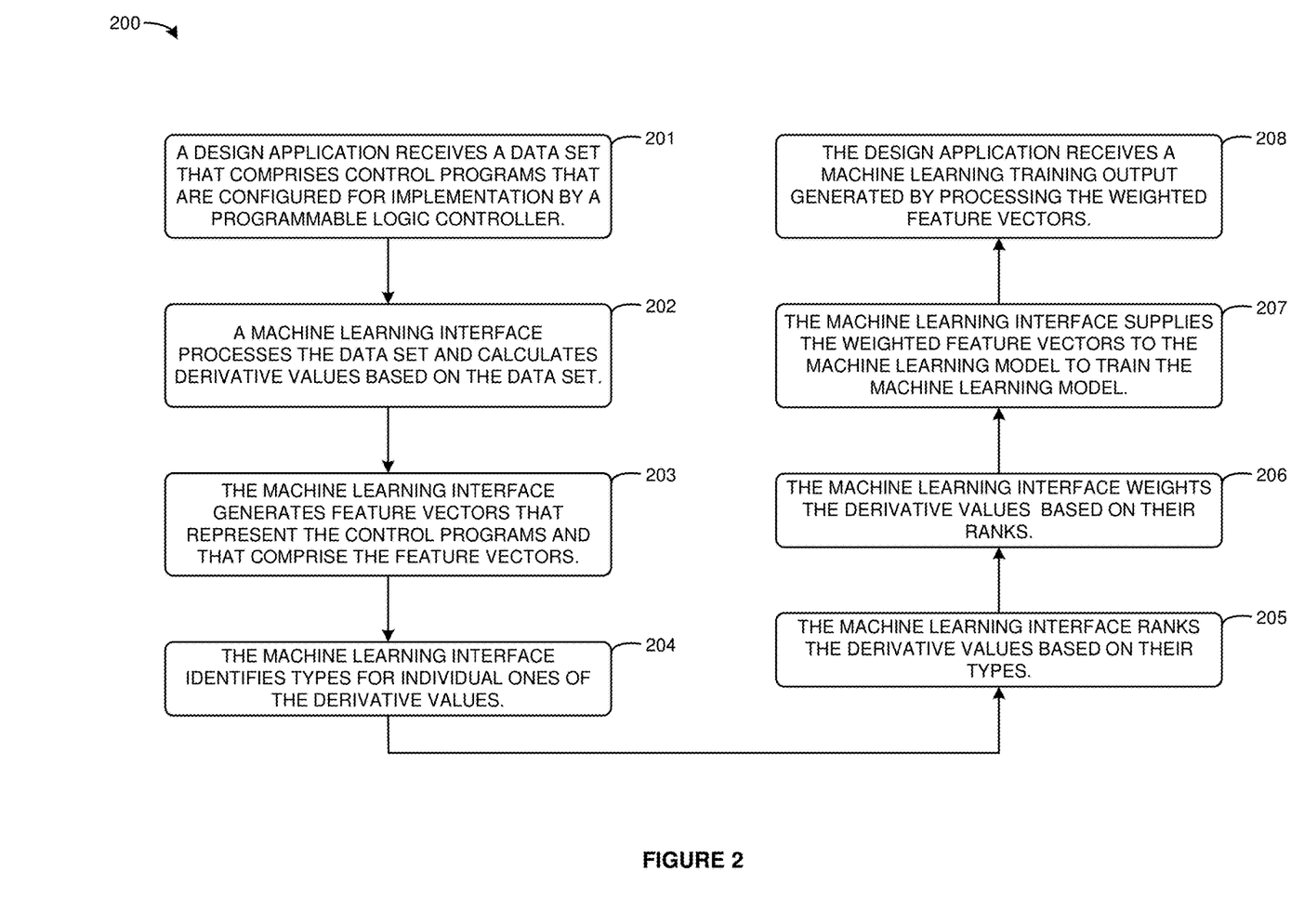
FIG. 2 illustrates an exemplary operation of an industrial automation environment to train a machine learning model.

In some examples, industrial automation environment 100 implements process 200 illustrated in FIG. 2. It should be appreciated that the structure and operation of industrial automation environment 100 may differ in other examples.

FIG. 2 illustrates process 200. Process 200 comprises a machine learning model training process. Program 200 may be implemented in program instructions in the context of any of the software applications, module components, or other such elements of one or more computing devices. The program instructions direct the computing device(s) to operate as follows, referred to in the singular for the sake of clarity.

In operation, a design application receives a data set that comprises control program configured for implementation by a PLC (201). A machine learning interface application process the data set and calculates derivative values based on the data set (202). The machine learning interface generates feature vectors that represent the control programs and that comprise the derivative values (203). The machine learning interface identifies types for individual ones of the derivative values (204). The machine learning interface ranks the derivative values based on their types (205). The machine learning interface weights the derivative values based on their ranks (206). The machine learning interface supplies the weighted feature vectors to the machine learning model to train the machine learning model (207). The design application receives a machine learning training output generated by processing the weighted feature vectors (208).

Referring back to FIG. 1, industrial automation environment 100 includes a brief example of process 200 as employed by one or more applications hosted by computing device 101. In operation, a design application hosted by computing device 101 receives a data set that comprises control programs configured for implementation by PLC 121 (201). For example, the application may receive a series of user inputs via UI 102 to that directs computing device 101 to retrieve a data set comprising control programs like control program 103. The application hosted by computing device 101 may comprise Studio 5000, or some other type of automated process design application.

A machine learning interface application hosted by computing device 101 processes the data set and calculates derivative values based on the data set (202). For example, the application may apply control logic to the data set and responsively perform feature extraction to generate the derivative values. The derivative values comprise numerical representations of objects that comprise the data set. The machine learning interface application uses the derivative values to generate feature vectors that represent the control programs (203). The feature vectors comprise n-dimensional vectors of the derivative values that represent control programs (or particular objects within the control programs) and are configured for ingestion by machine learning model 112. The application may generate the derivative values based on images of the control programs, the underlying code comprising functional blocks (e.g., input settings block), or some other type of representation of the control programs. Typically, multiple derivative values that represent a particular object are grouped into a single feature vector to represent that object. The machine learning interface application identifies types for individual ones of the derivative values (204). For example, the machine learning interface application may correlate the derivative values to ones of process variables 135 that govern automated industrial process 131. In some examples, the machine learning interface application identifies derivative values related to individual ones of process variables 135 and generates the feature vectors based on these relations. In doing so, the machine learning interface application may construct a feature vector for each relevant process variable.

The machine learning interface application ranks the derivative values based on their types (205). The rankings may be based on the effects independent variables of process variables 135 on the operation of automated industrial process 331. For example, process outputs 134 may comprise a target variable. The machine learning interface application may rank derivative values that represent ones of process variables 135 that affect the target variable higher than derivative values that represent ones of process variables 135 that do not affect the target variable. The derivative values may be further ranked based on the magnitude of their effects for a target variable. For example, if the target variable is temperature, the machine learning interface may determine that applied heat has a greater effect on temperature than moister content and may rank their feature vectors accordingly. The machine learning interface application weights the derivative vales based on their ranks (206). The weighted derivative values cause machine learning model 112 to place more emphasis on those feature vectors during training. This allows for machine learning model 112 to be trained to target a specific output variable. For example, the target variable may comprise the viscosity of process outputs 134 and derivative values that represent target variables that affect the viscosity of process outputs 134 are weighted so that machine learning model 112 is trained with specific emphasis on those derivative values. In doing so, the training of machine learning model 112 may be optimized for the selected target variable.

The machine learning interface application supplies the weighted feature vectors to machine learning model 112 (207). For example, the application hosted computing device 101 may transfer the feature vectors to machine learning model repository 111 via communication links and upon reception, are ingested by machine learning model 112. Machine learning model 112 takes the weighted feature vectors as a training input and trains its machine learning algorithms based on the weighted feature vectors. Machine learning model 112 generates a training indication. The design application hosted by computing device 101 receives the training indication from machine learning model repository 111 (208). The training indication may comprise a machine learning output, process optimization, control program suggestions, or some other output that indicates the training state of machine learning model 112. In some examples, the design application may determine that machine learning model 112 is not sufficiently trained based on the training indication. In this case, the design application may direct the interface application to re-weight the derivative values. The machine learning interface application may adjust the weights of the derivative values and supply the re-weighted feature vectors to machine learning model 112. This process may repeat iteratively until machine learning model 112 has reached a desired training state. Referring back to FIG. 2, it should be appreciated that the operation of process 200 and the computing elements that implement process 200 may differ in other examples.

Figure 3:
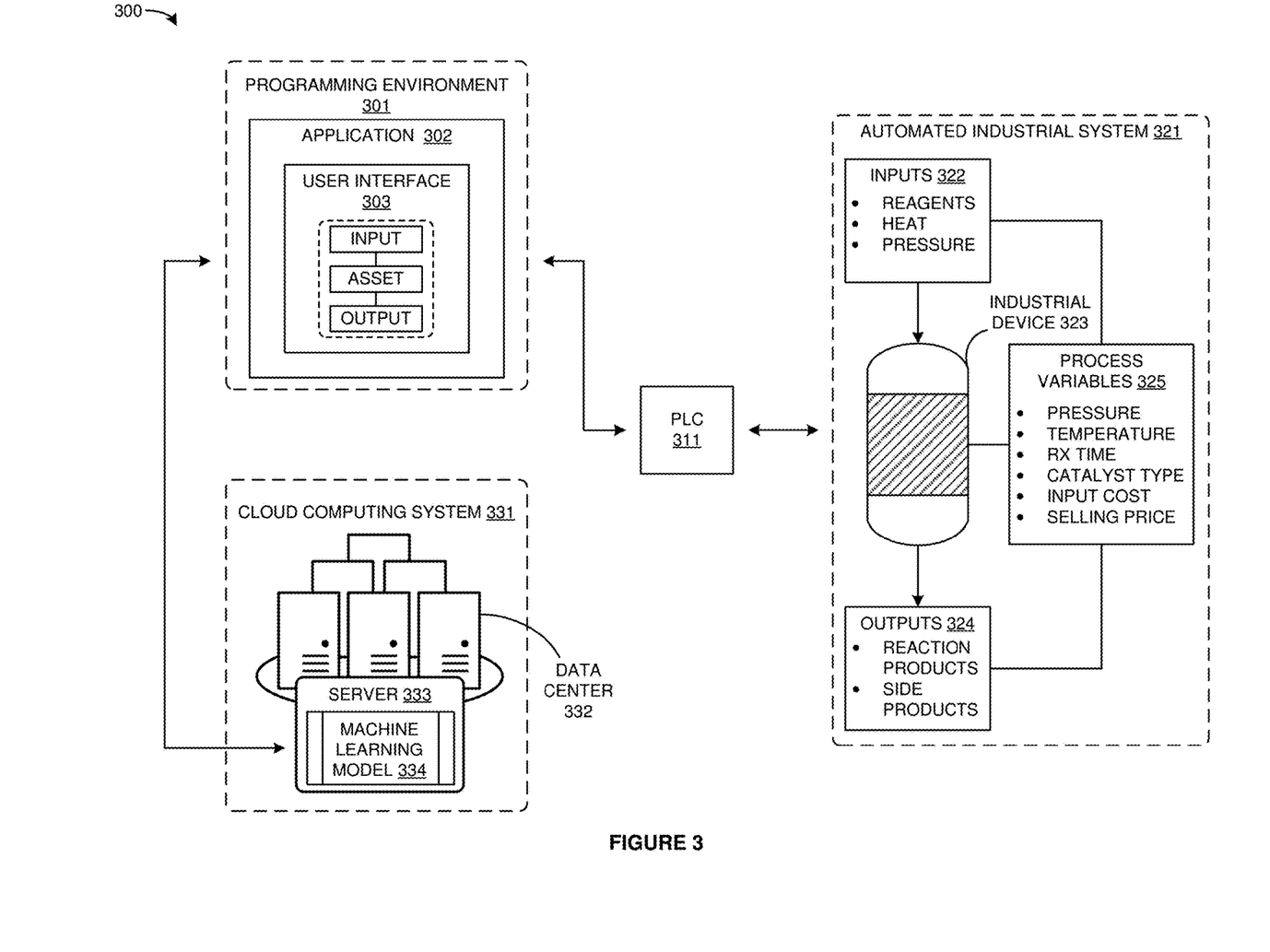
FIG. 3 illustrates an exemplary industrial automation environment to train a machine learning model.

FIG. 3 illustrates an industrial automation environment 300 to train a machine learning model. Industrial automation environment 300 comprises an example of industrial automation environment 100, however environment 100 may differ. Industrial automation environment 300 comprises programming environment 301, PLC 311, automated industrial system 321, and cloud computing system 331. Programming environment 301 comprises application 302 and User Interface (UI) 303. Cloud computing system 331 comprises data center 332, server 333, and machine learning model 334.

Programming environment 301 is representative of one or more computing devices integrated into a network configured to generate control instructions for industrial automation environment 300. Programming environment 301 comprises application 302. Application 302 is representative of one or more design applications, machine learning interface applications, and user interface applications that are configured to generate control programs like functional block diagrams for implementation in industrial automation environment 300. The one or more computing devices that comprise programming environment 301 comprise processors, bus circuitry, storage devices, software, and the like. The processors may comprise Central Processing Units (CPUs), Graphical Processing Units (GPUs), Application Specific Integrated Circuits (ASICs), and the like. The storage devices comprise flash drives, Random Access Memory (RAM), Hard Disk Drives (HDDs), Solid State Drives (SSDs), Non-Volatile Memory Express (NVMe) SSDs, and the like. The storage devices store the software. The processors may retrieve and execute software stored on the storage devices to drive the operation of application 302.

UI 303 may include a display that provides a graphical representation of application 302. The graphical representation may include one or more visual indicators relevant to the control program, such as visual indicators of code blocks, ladder logic, code chunks, functional block diagrams, machine learning training schemes, machine learning optimizations, and/or other types of visual indictors. UI 303 may comprise a faceplate for viewing or use by an operator or similar user within programming environment 301. UI 303 may include a computer, a mobile device, a kiosk, a touchscreen device, a Human Machine Interface (HMI) or some other type of computing device capable of performing the UI functions described herein. A user may interact with application 302 via UI 303 to generate machine learning training data like weighted feature vectors to initiate the training of machine learning model 344. Upon generation of the training data, application 302 may transfer the machine learning training data to machine learning model 334. For example, application 302 may utilize control logic to calculate derivative values that represent a control program and weight the derivative values to perform targeted training of machine learning model 334.

PLC 311 comprises a computing device configured to control an industrial process conducted by automated industrial system 321. PLC 311 is coupled to programming environment 301 and to automated industrial system 321. PLC 311 may receive and execute a control program generated by application 302. PLC 311 may transfer the executed instructions to automated industrial system 321 to implement its industrial processes. Automated industrial system 321 receive the executed instructions and responsively implements its industrial process. For example, industrial device 323 may comprise a reactor vessel with an electric pump and the control instructions may dictate a volumetric flowrate to operate the electric pump at. PLC 311 may execute the control instructions and determine a current level to power the electric pump motors at to achieve the desired volumetric flowrate speed. PLC 311 may transfer the executed instructions industrial device 323. Industrial device 323 may receive the executed instructions and apply the indicated current level to drive the pump to achieve the desired volumetric flow rate.

Automated industrial system 321 is representative of one of more machines that carry out an industrial process. In this example, automated industrial systems 321 carries out a chemical production process. However, in other examples, the industrial process carried out by automated industrial system 321 may differ. For example, automate industrial system 321 may carry out a manufacturing processes, a different chemical production process, a food production process, or another type of automated industrial process. Although automated industrial system 321 is illustrated with industrial device 323, automated industrial system 321 may comprise additional devices like pumps, compressors, heat exchanges, centrifuges, mills, conveyers, filters, and the like. The individual machines of industrial system 321 comprise subcomponents (not illustrated for clarity) like electrical circuitry, motors, processing circuitry, transceivers, machined parts, and the like. It should be appreciated that the number machines of that comprise automated industrial systems 321 or the type of automated processes they implement, are not limited.

In this example, automated industrial system 321 comprise inputs 322, industrial device 323, outputs 324, and process variables 325. As stated above, automated industrial system 321 implements a chemical production process. Industrial device 323 comprises a reactor vessel configured to conduct the reaction. Inputs 322 are representative of reaction inputs to produce desired reaction and comprise elements like reagents, heat, pressure, and the like. Outputs 324 are representative of reaction products generated by industrial device 323 like reaction products, side products, and the like. Industrial devices 323 receives inputs 322, implements a chemical production process on inputs 323, and generates outputs 324. Process variables 325 are representative of the various elements the dictate the operation and composition of inputs 322, industrial device 323, and outputs 324. Process variables 325 comprise variables like pressure level, temperature, reaction time, catalyst type, input costs, output selling price, and the like. Process variables 325 may be set by a control program and/or used as inputs to design the control program. For example, a control program may dictate a pressure level for operating industrial device 323.

In some examples, automated industrial system 321 report performance metrics to PLC 311 for the various systems that comprise inputs 322, device 323, outputs 324, and variables 325. For example, outputs 324 may comprise a flowmeter and the flowmeter may report a reaction product flowrate to PLC 311. PLC 311 may report the performance metrics to programming environment 301 for storage, processing by application 302, presentation to a user, and the like.

Cloud computing system 331 comprises data center 332. Data center 332 is representative of one or more computing devices integrated into a network that communicates with application 302 in programming environment 301. Examples of data center 332 may include server computers and data storage devices deployed on-premises, in the cloud, in a hybrid cloud, or elsewhere, by service providers such as enterprises, organizations, individuals, and the like. Data center 332 may rely on the physical connections provided by one or more other network providers such as transit network providers, Internet backbone providers, and the like to communicate with programming environment 301. Data center 332 comprises server computer 333 which hosts machine learning model 334.

Server computer 333 comprises processors, bus circuitry, storage devices, software, and the like configured to host machine learning model 334. The processors may comprise Central Processing Units (CPUs), Graphical Processing Units (GPUs), Application Specific Integrated Circuits (ASICs), and the like. The storage devices comprise flash drives, Random Access Memory (RAM), Hard Disk Drives (HDDs), Solid State Drives (SSDs), Non-Volatile Memory Express (NVMe) SSDs, and the like. The storage devices store the software. The processors may retrieve and execute software stored on the storage devices to drive the operation of machine learning model 334.

Machine learning model 334 is hosted on server computer 333. Machine learning model 334 comprises one or more machine learning algorithms that are trained based on training data like weighted feature vectors. Machine learning model 334 may employ one or more machine learning algorithms through which data can be analyzed to identify patterns, make decisions, make predictions, or similarly produce output that can inform control programs and/or process parameters. Examples of machine learning algorithms that may be employed solely or in conjunction with one another include artificial neural networks, nearest neighbor methods, ensemble random forests, support vector machines, naïve Bayes methods, linear regressions, or other types of machine learning algorithms that predict output data based on input data. Determining which machine learning methods to use may depend on the specific purpose or functions required in a particular industrial setting. Machine learning model 334 may receive feature vectors, control instructions, block diagrams, image files, performance metrics, and/or other types of training data from programming environment 301. Machine learning model 334 may ingest the training data received from data programming environment 301 to train itself. Machine learning model 334 may utilize supervised learning methods, unsupervised learning methods, and/or reinforcement learning methods to train itself. In some examples, machine learning model 334 receives weighted feature vectors from programming environment 301. The weighted feature vectors comprise weighted derivative values to train machine learning model 334 for a specific process. For example, the weighted derivative values may correspond to ones of process variables 325 that affect reaction (RX) time and may resulting in the training of machine learning model 334 to focus on reaction time.

Machine learning model 334 may ingest feature vectors that represent a control program as an input and generate an output that comprises an optimization for the control program. Machine learning model 334 utilizes its trained algorithms to process the inputs to generate an output. For example, machine learning model 334 may intake a functional block diagram created by a user and generate an output that indicates an optimization of a target parameter for a functional block diagram. The output may comprise a recommendation, optimization, error alert, notification, or some other type of output. Server 333 may transfer or otherwise indicate the machine learning output to application 302 for presentation on UI 303. A user may review the machine learning output and elect to accept the output to modify the control instructions. Alternatively, a user may review the machine learning output and elect to reject the output to modify the control instructions. In some examples, server 333 and application 302 may have a live connection with one another. Machine learning model 334 may ingest "work-in-progress" control instructions or otherwise incomplete control instructions and generate outputs to provide real-time or near real-time feedback on control instructions being generated by a user via UI 303.

Figure 4:
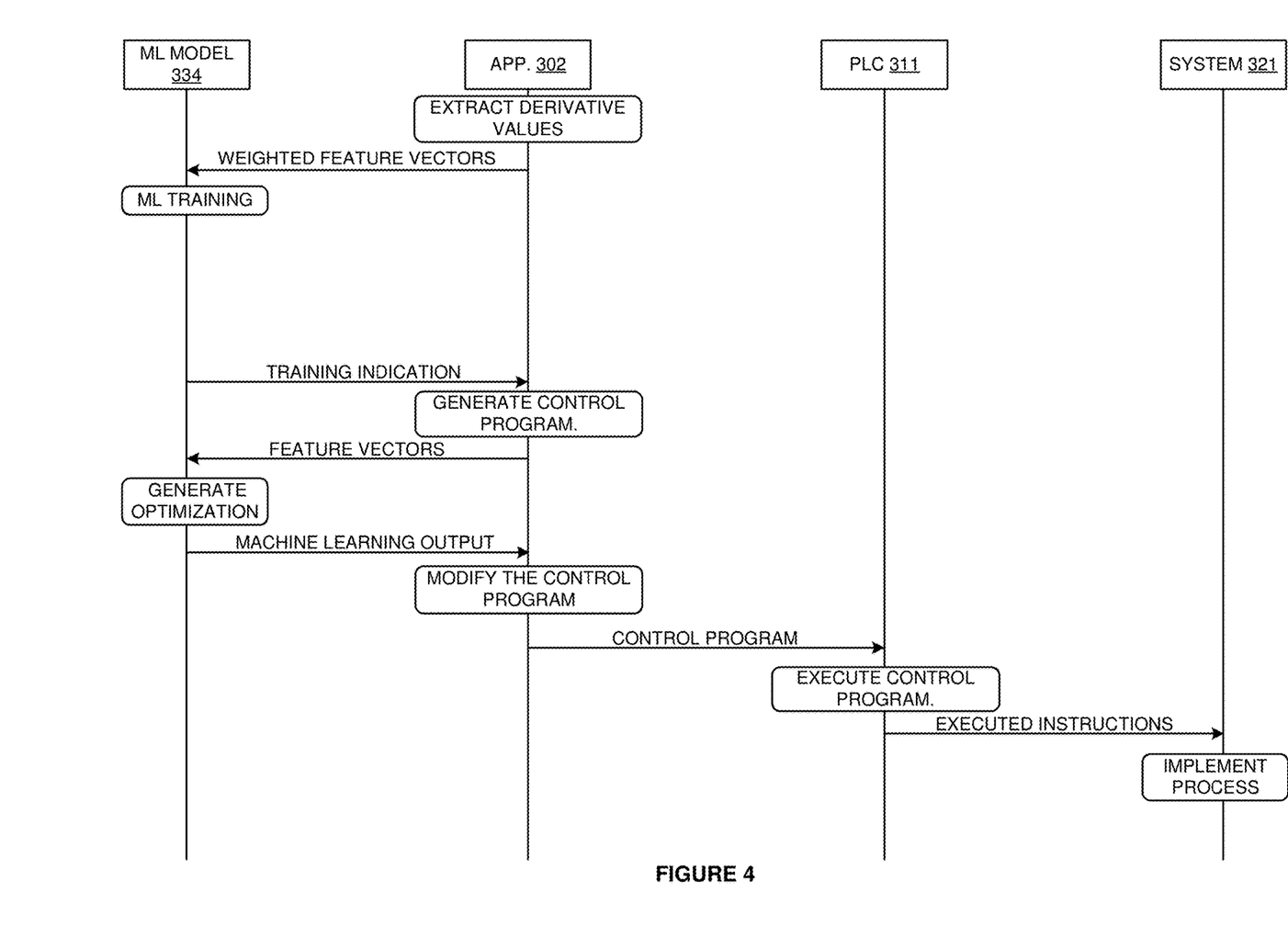
FIG. 4 illustrates an exemplary operation of an industrial automation environment to train a machine learning model.

FIG. 4 illustrates an exemplary operation of industrial automation environment 300 to optimize a functional block diagram for implementation by a PLC. The operation depicted by FIG. 4 comprises an example of process 200 illustrated in FIG. 2, however process 200 may differ. In other examples, the structure and operation of industrial automation environment 300 may be different.

In operation, application 302 accesses control program data relevant to automated industrial system 321. The data may comprise completed control programs that were previously implemented by system 321, process variables that control the operation of system 321, a user generated control program, and the like. Application 302 implements a feature extraction process to calculate derivative values based on the control program data. The derivative values comprise numeric representations of various features of the control program data. For example, one or more of the derivative values may represent an operating temperature of device 323 in automated industrial system 321. Application 302 generates feature vectors using the derivative values. For example, application 302 may identify a set of derivative values that each correspond to one of process variables 325 and generate a feature vector comprising those derivative values to create a feature vector for that variable. Application 302 weights individual ones of the derivative values based on the process variables. For example, application 302 may identify a target variable in automated industrial system 321, identify a set of independent variables that affect the target variable, and weight ones of the derivative values that represent the independent variables. The weighting process may alter the derivative values to place emphasis on specific derivative values to influence the training of machine learning model 344. The weighting process may comprise attaching a multiplier to ones of the derivative values, duplicating ones of the derivative values, omitting ones of the derivative values, and/or some other type of weighting procedure. In some examples, the magnitude of the weights depends in part on the magnitude of the effects of the derivative values. For example, a derivative value that represents an independent variable that has a large effect on a target variable may have a larger weight than a derivative value that represents an independent variable with a minimum effect on the target variable. Application 302 transfers the weighted feature vectors to machine learning model 344.

Machine learning model 334 receives the weighted feature vectors from application 302. Machine learning model 334 ingests the weighted feature vectors from application 302 and implements a machine learning training process. Machine learning model 334 trains its machine learning algorithms using the training data to identify patterns, make decisions, make predictions, or similarly produce outputs that can provide feedback on control instructions generated by programming environment 301. The weighting of the derivative values causes the training of the machine learning model to focus on an aspect of an industrial process. For example, if a target variable is selected and derivative values that represent relevant independent variables are weighted, machine learning model 334 may be effectively trained to generate outputs that impact the selected target variable. Machine learning model 334 transfers a training indicating to application 302 to inform application 302 the training process is complete.

Application 302 receives user input from a user via UI 303. The user input causes application 302 to generate a control program like a functional block diagram. The control program may be implemented by a PLC (e.g., PLC 311) to control an automated system (e.g., automated system 321). Application 302 generates calculates derivative values that represent the control program and generates feature vectors comprising derivative values. Application 302 transfers the feature vectors for delivery to machine learning model 334. For example, application 302 may transfer the feature vectors for ingestion by machine learning model 334 to optimize a target variable.

Machine learning model 334 receives and ingests the feature vectors as a machine learning input. Machine learning model 334 algorithmically processes the feature vectors and identifies optimizations for the control program. For example, machine learning model 334 may utilize machine learning algorithms trained on the weighted feature vectors to compare ingested feature vectors that represent the control program to historical block diagrams to optimize a target variable. The optimizations may comprise block suggestions, block connection suggestions, error alerts, expected output results, and the like. For example, machine learning model 334 may determine the control program comprises a non-optimal pressure with respect to a target variable, and responsively suggest a new pressure setting to maximize the target variable. Machine learning model 334 transfers the machine learning output for delivery to application 302. Upon reception, application 302 presents the suggested optimization(s) to the user via UI 303. The user may interact with UI 303 to implement or reject the suggested optimization to the functional block diagram. If the user implements the suggested optimization, application 302 modifies the control program to implement the machine learning output. Application 302 transfer the functional block diagram for delivery to PLC 311

PLC 311 receives the receives and executes the control program from application 302. PLC 311 transfers the executed instructions to automated industrial system 321. In response to receiving the executed instructions, automated industrial system 321 implements its industrial process.

Advantageously, industrial automation environment 300 effectively weights derivative values to perform targeted training of machine learning model 344. Moreover, industrial automation environment 300 efficiently implements machine learning optimizations generated by machine learning model 344 that has undergone targeted training.

Figure 5:
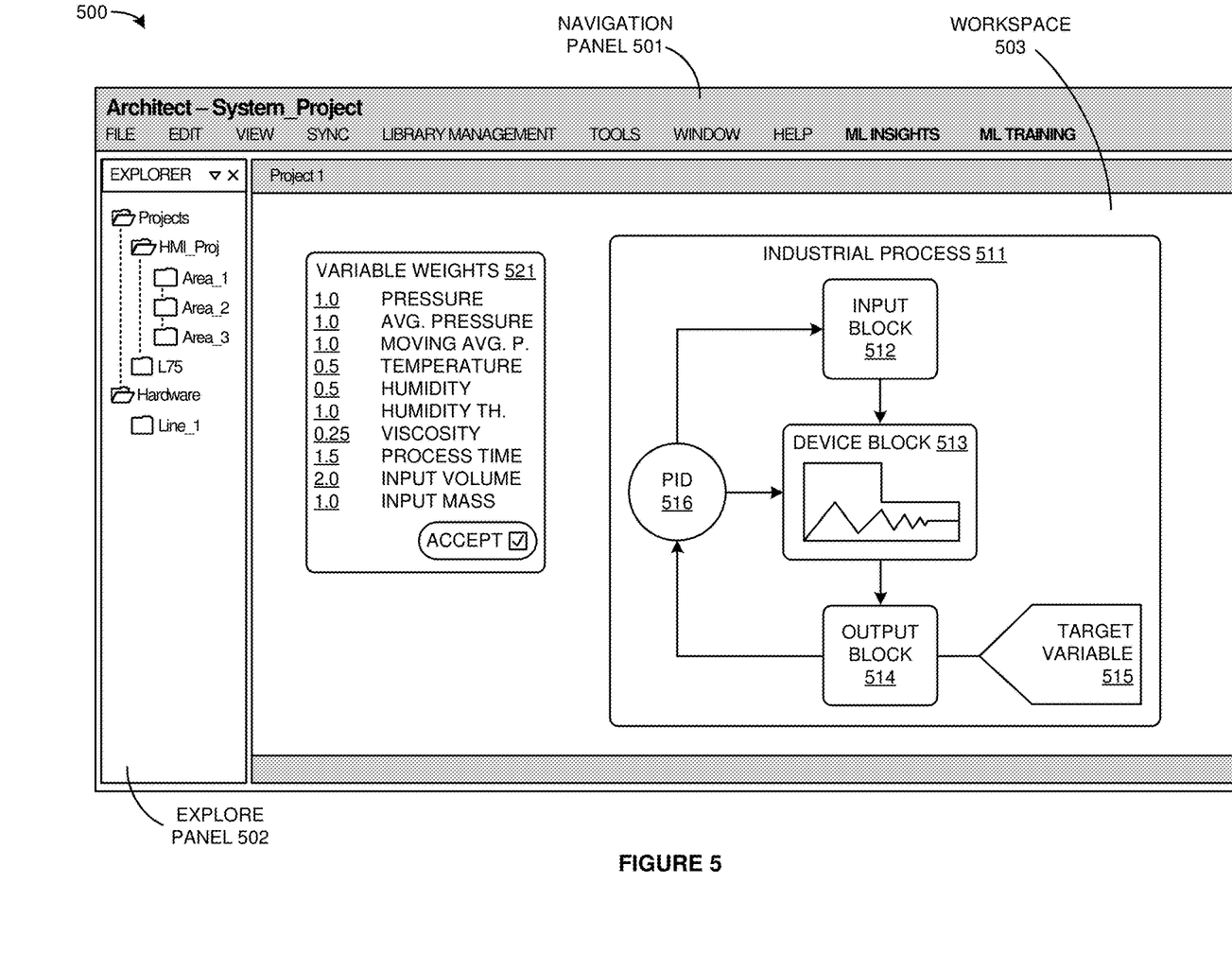
FIG. 5 illustrates an exemplary User Interface (UI) in an industrial automation environment.

FIG. 5 illustrates user interface 500 to train a machine learning model to target an industrial process. User interface 500 comprises an example of UI 102 and UI 303, however UI 102 and UI 303 may differ. User interface 500 comprises a programming environment presented on a display screen which is representative of any user interface for generating control programs. For example, user interface 501 may comprise an HMI configured to allow a user to interact with a design application to generate a control program represented as a functional block diagram.

User interface 500 includes navigation panel 501 that allows a user to access the various features available through user interface. Navigation panel 501 comprises tabs like "FILE", "EDIT", "VIEW", "LIBRARY MANAGEMENT", "TOOLS", "WINDOW", "HELP", "ML INSIGHT", and "ML TRAINING". In other examples, navigation panel 501 may comprise fewer tabs, more tabs, and/or different types of tabs. A user may select a tab to access the functionality of the tab. Upon selection, the tabs may open drop down menus that list their functionality. For example, a user may select the "TOOLS" tab and select an option from a drop-down menu to access an industrial asset. Navigation panel 501 is located on a top portion of user interface 500 however navigation panel 501 may be located on a different portion of user interface 500. For example, navigation panel 501 may be located on the bottom portion of user interface 500.

User interface 500 incudes explore panel 502. Explore 502 panel comprises a file navigation system that allows a user to access various projects and view information. The files comprise names like "Projects", "HMI_Proj", "Area_2", "Area_2", "Area_3", "L75", "Hardware", and "Line_1". The files are organized in a hierarchy. A user may select one of the files to access the contents stored within the file. For example, a user may select the "L75" folder to access its contents. Explore panel 502 is located on a left portion of user interface 500 however explore panel 502 may be located on a different portion of user interface 500. For example, explore panel 502 may be located on the right portion of user interface 500.

User interface includes workspace 503. Workspace 503 comprises industrial process 511 that forms a user generated functional block diagram. Industrial process 511 is an example of the control programs referenced in the preceding Figures and comprises input block 512, device block 513, output block 514, target variable 515, and Proportion Integral Derivative (PID) control block 516. Blocks 512-516 each correspond to an industrial asset that may be used in an automated industrial system. In this example, block 512 is an input stream to device block 513, block 513 is an industrial device, and block 514 is an output stream generated by block 513. Block 515 is a target variable of output block 514. For example, a user may set the viscosity of output block 514 to be target variable 515. PID block 516 is a control mechanism to maintain target variable 515 in a specified range. In PID control schemes, a PID controller measures an output of a process, and adjusts inputs to the process to maintain the output within a range. It should be noted that the types of equipment and processes represented by industrial process 511 are not limited and that in other examples, blocks 512-516 may correspond to different types of equipment and/or a different type of process.

A user may drag and drop blocks 512-516 on to workspace 503 to form the functional block diagram. Each of blocks 512-516 comprise underlying control code that dictates the operation of their corresponding industrial asset. The user may interact with blocks 512-516 to specify the various operating parameters for each of the blocks. For example, a user may interact with block 512 to specify a desired temperature, flowrate, pressure, and the like for input block 512. The user may connect the blocks to define a process flow thereby creating a control program for industrial process 511.

Variable weights 521 is representative of user defined weights for a set of variables to perform machine learning model training. In some examples, a user may define target variable 515 for output block 514. The user may then select the select the "ML TRAINING" tab from navigation panel 501 to access variable weights 521. In response to the selection, the application may determine variables that effect the defined target variable 515 and UI 500 may present those variables in variable weights 521. For example, target variable 515 may comprise viscosity of output block 515 and the application may identify independent variables of input block 512 and device block 513 that affect the viscosity of output block 514. A user may interact with UI 500 and input desired weights for each of the identified variables. In some examples, the application may alternatively suggest weights for the variables instead of receiving them via user input. Once each weight is defined, the user may select the "ACCEPT" button to initiate the training process. Upon the selection of the "ACCEPT" button, the application may calculate derivative values for industrial process 511. The application may correlate the derivative values to the identified variables and weight the correlated derivative values using the user defined weights. The application generates feature vectors that comprise the derivative values and transfers the weighted feature vectors to train the machine learning model.

Figure 6:
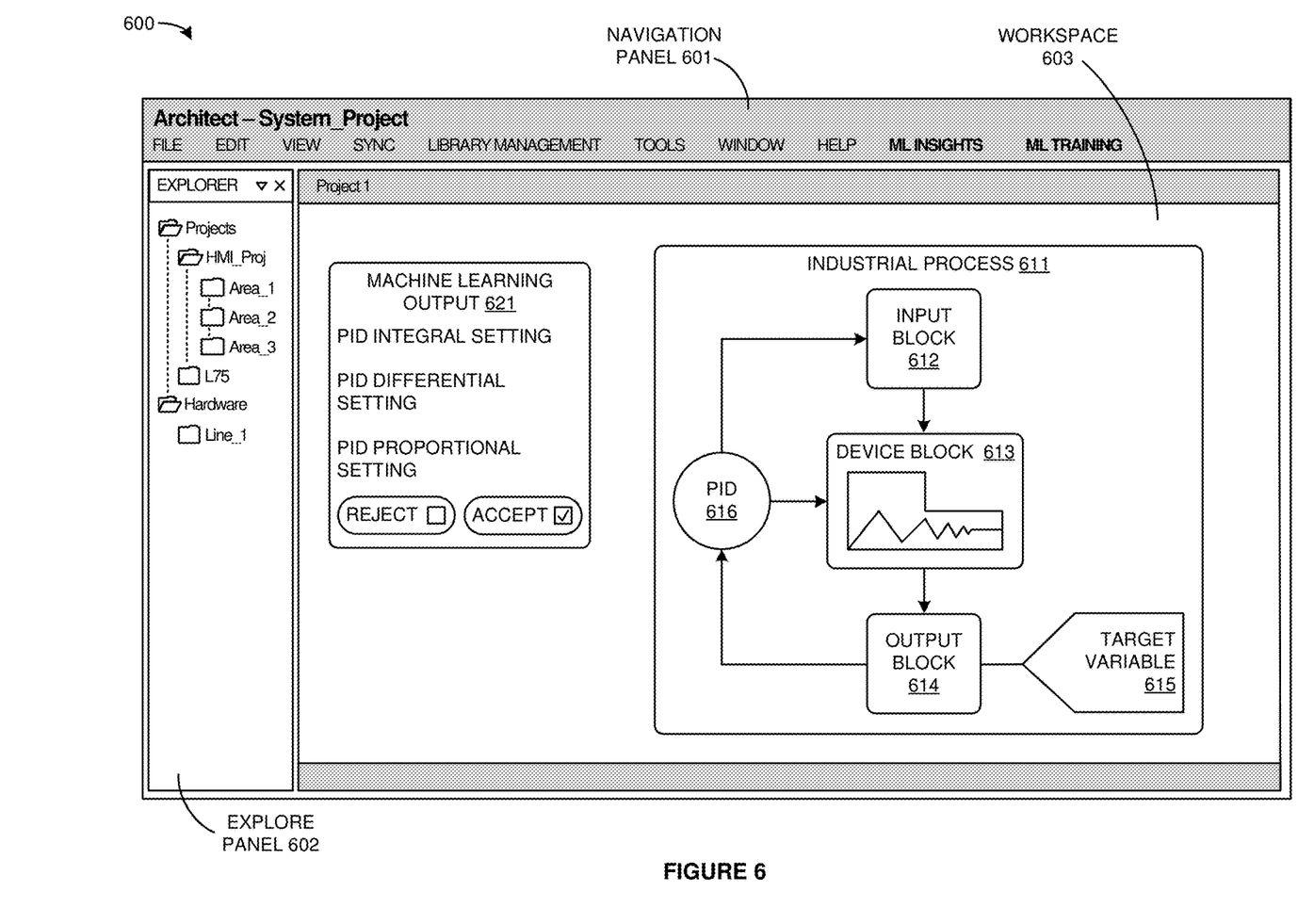
FIG. 6 illustrates an exemplary UI in an industrial automation environment.

FIG. 6 illustrates user interface 600 to train a machine learning model to target an industrial process. User interface 600 comprises an example of UI 102 and UI 303, however UI 102 and UI 303 may differ. User interface 600 comprises a programming environment presented on a display screen which is representative of any user interface for generating control programs.

User interface 600 includes navigation panel 601 that allows a user to access the various features available through user interface. Navigation panel 601 comprises tabs like "FILE", "EDIT", "VIEW", "LIBRARY MANAGEMENT", "TOOLS", "WINDOW", "HELP", "ML INSIGHT", and "ML TRAINING". In other examples, navigation panel 601 may comprise fewer tabs, more tabs, and/or different types of tabs. A user may select a tab to access the functionality of the tab. Upon selection, the tabs may open drop down menus that list their functionality. For example, a user may select the "TOOLS" tab and select an option from a drop-down menu to access an industrial asset. Navigation panel 601 is located on a top portion of user interface 600 however navigation panel 601 may be located on a different portion of user interface 600. For example, navigation panel 601 may be located on the bottom portion of user interface 600.

User interface 600 incudes explore panel 602. Explore 602 panel comprises a file navigation system that allows a user to access various projects and view information. The files comprise names like "Projects", "HMI_Proj", "Area_2", "Area_2", "Area_3", "L75", "Hardware", and "Line_1". The files are organized in a hierarchy. A user may select one of the files to access the contents stored within the file. Explore panel 602 is located on a left portion of user interface 600 however explore panel 602 may be located on a different portion of user interface 600. For example, explore panel 602 may be located on the right portion of user interface 600.

User interface includes workspace 603. Workspace 603 comprises industrial process 611 that forms a user generated functional block diagram. Industrial process 611 comprises input block 612, device block 613, output block 614, target variable 615, and Proportion Integral Derivative (PID) control block 616. Blocks 612-616 each correspond to an industrial asset that may be used in an automated industrial system. In this example, block 612 is an input stream to device block 613, block 613 is an industrial device, and block 614 is an output stream generated by block 613. Block 615 is a target variable of output block 614. For example, a user may set the density of output block 614 to be target variable 615. PID block 616 is a control mechanism to maintain target variable 615 in a specified range. In PID control schemes, a PID controller measures an output of a process, and adjusts inputs to the process to maintain one or more aspects of the output within a range. It should be noted that the types of equipment and processes represented by industrial process 611 are not limited and that in other examples, blocks 612-616 may correspond to different types of equipment and/or a different type of process.

A user may drag and drop blocks 612-616 on to workspace 503 to form the functional block diagram. Each of blocks 612-616 comprise underlying control code that dictates the operation of their corresponding industrial asset. The user may interact with blocks 612-616 to specify the various operating parameters for each of the blocks. For example, a user may interact with block 612 to specify a desired temperature, flowrate, pressure, and the like for input block 612. The user may connect the blocks to define a process flow thereby creating a control program for industrial process 611.

Machine learning output 621 is representative of an optimization to industrial process 611. In this example, machine learning output 621 comprises recommended PID integral, differential, and proportional settings for PID controller block 616. Machine learning output 621 also comprise "REJECT" and "ACCEPT" buttons that allow a user to implement or reject the suggested optimization. In some examples, once a machine learning model has been trained with respect to target variable 615 (e.g., weighted feature vector training), a user may select the "ML INSIGHTS" tab to receive machine learning feedback on industrial process 611. Upon selection of the "ML INSIGHTS" tab, the application calculates derivative for industrial process 611 and generates feature vectors comprising the derivative values to represent process 611. The application transfers the feature vectors to the trained machine learning model. The machine learning model processes the feature vectors and responsively generates a machine learning output. The application receives machine learning output 621 and presents machine learning output 621 on workspace 603 for view by the user. A user may select the "ACCEPT" button to integrate the suggested PID settings into industrial process 611. In this example, the machine learning model was trained with respect to target variable 615, and the suggested PID settings are configured to optimize target variable 615. The optimization may comprise a minimization, a maximization, a target range, and the like. In some examples, a user may select the "REJECT" button when the machine learning output is not satisfactory. In this case, the user may retrain the machine learning model by inputting new re-weighting relevant process variables in a manner similar to the one illustrated in FIG. 5.

Figure 7:
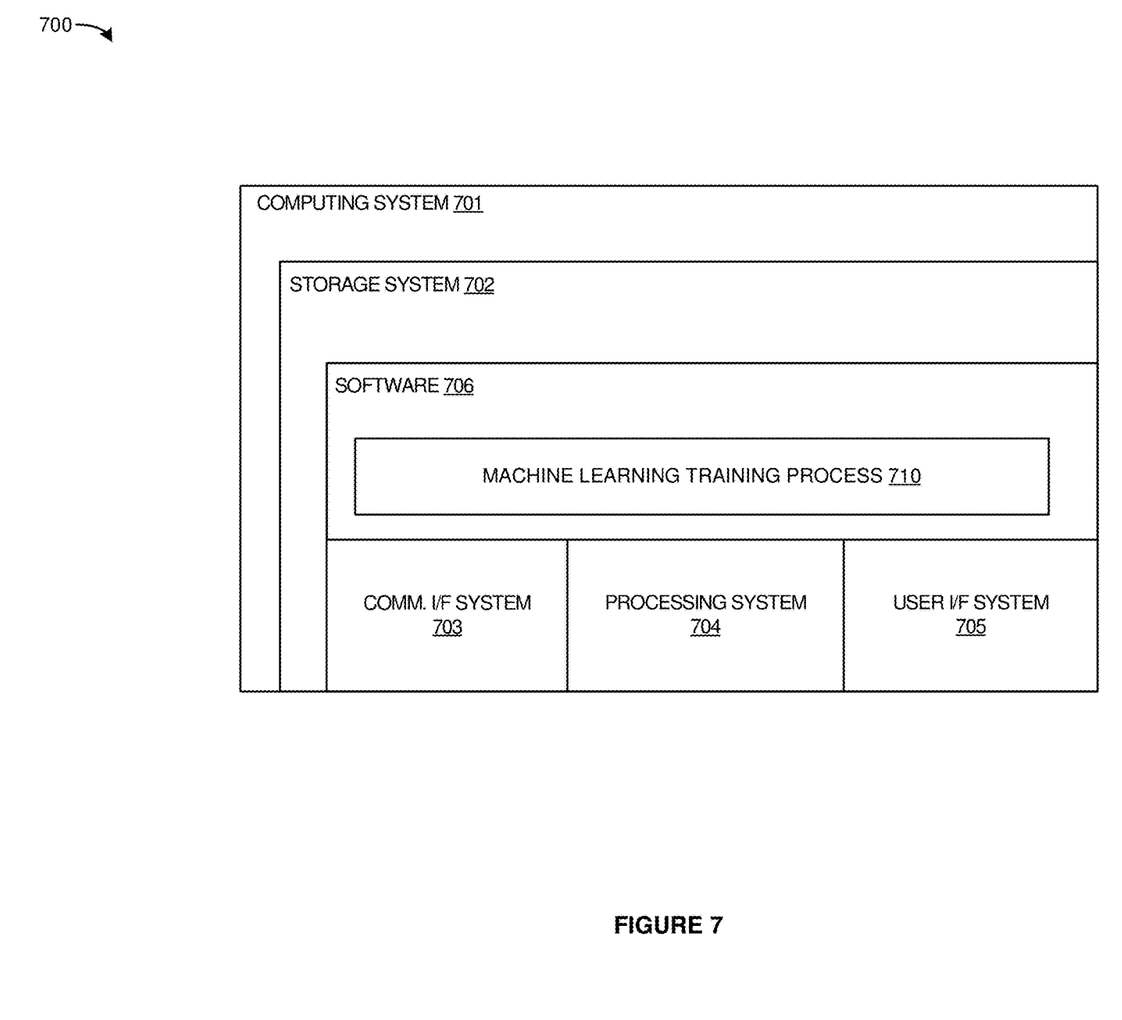
FIG. 7 illustrates an exemplary computing device that may be used in accordance with some embodiments of the present technology.

FIG. 7 illustrates computing system 701 to perform machine learning model implementation according to an implementation of the present technology. Computing system 701 is representative of any system or collection of systems with which the various operational architectures, processes, scenarios, and sequences disclosed herein for utilizing machine learning models within industrial automation environments may be employed. For example, computing system 701 may be representative of computing device 101, machine learning model repository 111, programming environment 301, cloud computing system 331, and/or any other computing device contemplated herein. Computing system 701 may be implemented as a single apparatus, system, or device or may be implemented in a distributed manner as multiple apparatuses, systems, or devices. Computing system 701 includes, but is not limited to, processing system 704, storage system 702, software 706, communication interface system 703, and user interface system 705 (optional). Processing system 704 is operatively coupled with storage system 702, communication interface system 703, and user interface system 705.

Processing system 704 loads and executes software 706 from storage system 702. Software 706 includes and implements machine learning training process 710, which is representative of any of the machine learning training processes discussed with respect to the preceding Figures, including but not limited to machine learning model training, control program optimization, and industrial control. For example, machine learning training process 710 may be representative of process 200 illustrated in FIG. 2 and/or the exemplary operation of environment 300 illustrated in FIG. 4. When executed by processing system 704 to provide machine learning training functions, software 706 directs processing system 704 to operate as described herein for at least the various processes, operational scenarios, and sequences discussed in the foregoing implementations. Computing system 701 may optionally include additional devices, features, or functionality not discussed for purposes of brevity.

Processing system 704 may comprise a micro-processor and other circuitry that retrieves and executes software 706 from storage system 702. Processing system 704 may be implemented within a single processing device but may also be distributed across multiple processing devices or sub-systems that cooperate in executing program instructions. Examples of processing system 704 include general purpose central processing units, graphical processing units, application specific processors, and logic devices, as well as any other type of processing device, combinations, or variations thereof.

Storage system 702 may comprise any computer readable storage media readable by processing system 704 and capable of storing software 706. Storage system 702 may include volatile, nonvolatile, removable, and/or non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 702 may also include computer readable communication media over which at least some of software 706 may be communicated internally or externally. Storage system 702 may be implemented as a single storage device but may also be implemented across multiple storage devices or sub-systems co-located or distributed relative to each other. Storage system 702 may comprise additional elements, such as a controller, capable of communicating with processing system 704 or possibly other systems.

Software 706 (including machine learning training process 710) may be implemented in program instructions and among other functions may, when executed by processing system 704, direct processing system 704 to operate as described with respect to the various operational scenarios, sequences, and processes illustrated herein. For example, software 706 may include program instructions for generating and weighted derivative values for machine learning training as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 706 may include additional processes, programs, or components, such as operating system software, virtualization software, or other application software. Software 706 may also comprise firmware or some other form of machine-readable processing instructions executable by processing system 704.

In general, software 706 may, when loaded into processing system 704 and executed, transform a suitable apparatus, system, or device (of which computing system 701 is representative) overall from a general-purpose computing system into a special-purpose computing system customized to provide machine learning functionality to an industrial automation environment as described herein. Indeed, encoding software 706 on storage system 702 may transform the physical structure of storage system 702. The specific transformation of the physical structure may depend on various factors in different implementations of this description. Examples of such factors may include, but are not limited to, the technology used to implement the storage media of storage system 702 and whether the computer-storage media are characterized as primary or secondary storage, as well as other factors.

For example, if the computer readable storage media are implemented as semiconductor-based memory, software 706 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 703 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and an extended discussion of them is omitted for the sake of brevity.

While some examples provided herein are described in the context of training a machine learning model, it should be understood that the condition systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system to train a machine learning model for implementation in an industrial automation environment, the system comprising:
   a memory that stores executable components; and
   a processor, operatively coupled to the memory, that executes the executable components, the executable components comprising:
   a design component configured to receive a data set that comprises a control program that is configured for implementation by a Programmable Logic Controller (PLC);
   a machine learning interface component configured to process the data set, calculate derivative values based on the data set, identify types for individual ones of the derivative values, rank the derivative values based on their types, and weight the derivative values based on their ranks;
   the machine learning interface component further configured to generate feature vectors that comprise the weighted derivative values and supply the feature vectors to the machine learning model to train the machine learning model; and
   the design component further configured to receive a machine learning training output generated by processing the feature vectors.

2. The system of claim 1 wherein:
   the design component is further configured to generate an additional data set that comprises an additional control program configured for implementation by the PLC;
   the machine learning interface component is further configured to process the additional data set, calculate additional derivative values based on the additional data set, and responsively generate additional feature vectors that comprise the additional derivative values wherein the additional feature vectors represent the additional control program, and supply the additional feature vectors to the machine learning model; and
   the design component is further configured to receive a machine learning output from the machine learning model that comprises a modification to the additional control program.

3. The system of claim 2 wherein:
   the machine learning model is further configured to receive the additional feature vectors;
   the machine learning model is further configured to ingest the additional feature vectors, utilize machine learning algorithms trained on the feature vectors to process the additional feature vectors, and generate the machine learning output; and
   the machine learning model is further configured to transfer the machine learning output.

4. The system of claim 1 wherein the machine learning interface component is further configured to determine independent variables that affect inputs in the control program and correlate the independent variables to the individual ones of the derivative values to identify the types for the individual ones of the derivative values.

5. The system of claim 1 wherein the machine learning interface component is further configured to determine independent variables that affect inputs in the control program, correlate the independent variables to the individual ones of the derivative values, estimate magnitudes for effects of the independent variables, rank the derivative values based on the magnitudes of their effects, and weight the derivative values based on their ranks to rank the derivative values based on their types and weight the derivative values based on their ranks.

6. The system of claim 1 wherein the machine learning interface component is further configured to receive the machine learning training output generated by processing the feature vectors, adjust the weights for ones of the derivative values based on the machine learning training output, and supply re-weighted feature vectors to the machine learning model to further train the machine learning model.

7. The system of claim 1 wherein the control program comprises a functional block diagram configured for implementation by the PLC.

8. A non-transitory computer-readable medium storing instructions to train a machine learning model for implementation in an industrial automation environment, wherein the instructions, in response to execution by a processor, cause the processor to drive a system to perform operations comprising:
   receiving a data set that comprises a control program that is configured for implementation by a Programmable Logic Controller (PLC);
   processing the data set, calculating derivative values based on the data set, identifying types for individual ones of the derivative values, ranking the derivative values based on their types, and weighting the derivative values based on their ranks;
   generating feature vectors that comprise the derivative values and supplying the feature vectors to the machine learning model to train the machine learning model; and
   receiving a machine learning training output generated by processing the feature vectors.

9. The non-transitory computer-readable medium of claim 8, wherein the operations further comprise:
   generating an additional data set that comprises an additional control program configured for implementation by the PLC;
   processing the additional data set, calculating additional derivative values based on the additional data set, and responsively generating additional feature vectors that comprise the additional derivative values wherein the additional feature vectors represent the additional control program, and supplying the additional feature vectors to the machine learning model; and
   receiving a machine learning output from the machine learning model that comprises a modification to the additional control program.

10. The non-transitory computer-readable medium of claim 9, wherein the operations further comprise:
    receiving the additional feature vectors;

ingesting the additional feature vectors, utilizing machine learning algorithms trained on the feature vectors to process the additional feature vectors, and generating the machine learning output; and transferring the machine learning output.

11. The non-transitory computer-readable medium of claim 8 wherein identifying the types for the individual ones of the derivative values comprises determining independent variables that affect inputs in the control program and correlating the independent variables to the individual ones of the derivative values.

12. The non-transitory computer-readable medium of claim 8 wherein ranking the derivative values based on their types and weighting the derivative values based on their ranks comprises determining independent variables that affect inputs in the control program, correlating the independent variables to the individual ones of the derivative values, estimating magnitudes for effects of the independent variables, ranking the derivative values based on the magnitudes of their effects, and weighting the feature vectors based on their ranks.

13. The non-transitory computer-readable medium of claim 8, wherein the operations further comprise receiving the machine learning training output generated by processing the feature vectors, adjusting the weights for ones of the derivative values based on the machine learning training output, and supplying re-weighted feature vectors to the machine learning model to further train the machine learning model.

14. The non-transitory computer-readable medium of claim 8, wherein the control program comprises a functional block diagram configured for implementation by the PLC.

15. A method to train a machine learning model for implementation in an industrial automation environment, the method comprising:

receiving a data set that comprises a control program that is configured for implementation by a Programmable Logic Controller (PLC);

processing the data set, calculating derivative values based on the data set, identifying types for individual ones of the derivative values, ranking the derivative values based on their types, and weighting the derivative values based on their ranks;

generating feature vectors that comprise the derivative values and supplying the feature vectors to the machine learning model to train the machine learning model; and receiving a machine learning training output generated by processing the feature vectors.

16. The method of claim 15 further comprising:

generating an additional data set that comprises an additional control program configured for implementation by the PLC;

processing the additional data set, calculating additional derivative values based on the additional data set, and responsively generating additional feature vectors that comprise the additional derivative values wherein the additional feature vectors represent the additional control program, and supplying the additional feature vectors to the machine learning model; and receiving a machine learning output from the machine learning model that comprises a modification to the additional control program.

17. The method of claim 16 further comprising:

receiving the additional feature vectors;

ingesting the additional feature vectors, utilizing machine learning algorithms trained on the feature vectors to process the additional feature vectors, and generating the machine learning output; and transferring the machine learning output.

18. The method of claim 15 wherein identifying the types for the individual ones of the derivative values comprises determining independent variables that affect inputs in the control program and correlating the independent variables to the individual ones of the derivative values.

19. The method of claim 15 wherein ranking the derivative values based on their types and weighting the derivative values based on their ranks comprises determining independent variables that affect inputs in the control program, correlating the independent variables to the individual ones of the derivative values, estimating magnitudes for effects of the independent variables, ranking the derivative values based on the magnitudes of their effects, and weighting the derivative values based on their ranks.

20. The method of claim 15 wherein receiving the machine learning training output generated by processing the feature vectors comprises adjusting the weights for ones of the derivative values based on the machine learning training output and supplying re-weighted feature vectors to the machine learning model to further train the machine learning model.

* * * * *